M. BURKE.
OILING DEVICE.
APPLICATION FILED JUNE 14, 1921.

1,428,751. Patented Sept. 12, 1922.

Matt Burke
INVENTOR
BY Victor J. Evans
ATTORNEY

WITNESS:
C. Nye Fraser Jr.

Patented Sept. 12, 1922.

1,428,751

UNITED STATES PATENT OFFICE.

MATT BURKE, WEST DULUTH, MINNESOTA.

OILING DEVICE.

Application filed June 14, 1921. Serial No. 477,559.

*To all whom it may concern:*

Be it known that I, MATT BURKE, a citizen of the United States, residing at West Duluth, in the county of St. Louis and State of Minnesota, have invented new and useful Improvements in Oiling Devices, of which the following is a specification.

In internal combustion engines of the class employed for propelling automobiles and like vehicles, the crank case of the engine is provided with depressions forming oil wells which are arranged below the piston rods that are connected to the crank axle. On the reciprocation of the piston, the oil from these wells is splashed against the connecting rod bearing and the crank shaft around which the same is received. From experience, I have found that this construction does not afford ample lubrication of the parts, and not infrequently the connecting rod bearing does not receive oil from the well. This is especially true when the oil in the well is low.

It is the object of the present invention to provide an oiling device for the connecting rod bearing between the piston and crank shaft of an internal combustion engine which comprises a tubular member screwed in an opening in the bearing, having its lower end closed and provided with a projection in the nature of a scoop arranged opposite an opening in the tube, the said opening being closed by a spring valve, and whereby, when the bearing is moved laterally by the crank shaft, the lubricant in the well will enter the tube, forcing the valve open, the valve thereafter resuming its closed position so that all of the oil in the tube will be properly directed between the crank portion of the shaft and the connecting rod bearing.

The drawings illustrate a satisfactory embodiment of the improvement reduced to practice.

In the drawings:—

Figure 1:
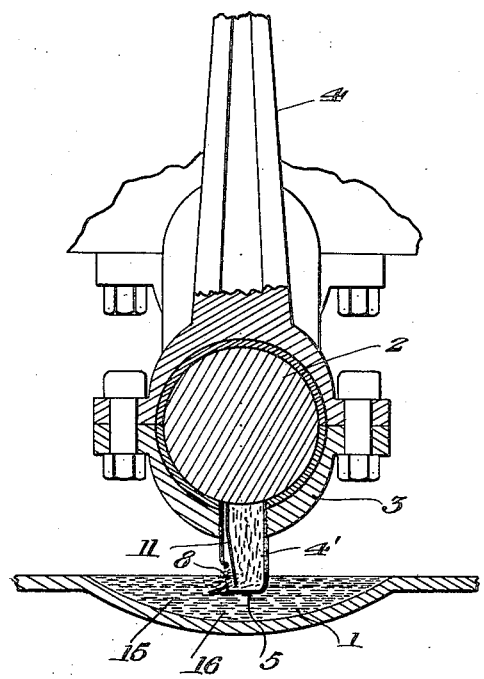
Figure 1 is a sectional view through a portion of an internal combustion engine showing the application of the improvement, parts being broken away and parts being in section.
Figure 2:
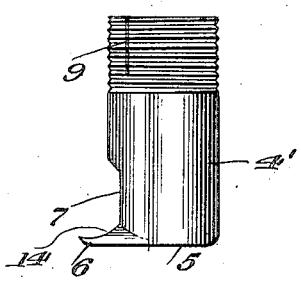
Figure 2 is a side elevation of the improvement.
Figure 3:
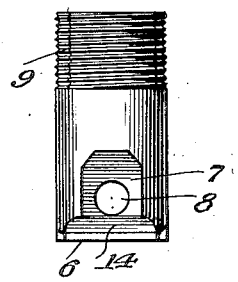
Figure 3 is a front elevation thereof.
Figure 5:
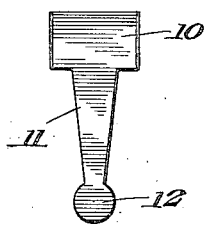
Figure 5 is a view of the spring.
Figure 6:
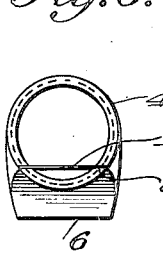
Figure 6 is a top plan view showing the manner in which the spring is secured in the tube.
Figure 4:
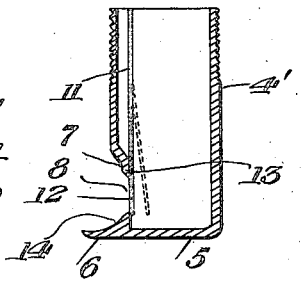
Figure 4 is an approximately central vertical longitudinal sectional view of the device illustrated in Figure 3.

Referring now to the drawings in detail, the numeral 1 designates an oil well in the bottom section of an internal combustion engine casing, 2 a portion of the crank shaft, 3 the connecting rod bearing, and 4 the connecting rod which is secured to the piston, (not shown).

In carrying out my invention, I provide the connecting rod bearing 3, on the under face thereof with a threaded opening in which I screw the threaded end of a tubing 4. The tube has its bottom closed, as at 5, its said bottom having a projecting portion 6 beyond one of the sides thereof forming an oil scoop. The face of the tube on which the scoop 6 is formed, and directly above the said scoop is provided with an inwardly depressed portion 7 that has a central opening 8. The tube, from its upper end, and in a line with the inner wall of the surface 7 is slitted, as at 9, the said slits receiving therein the widened portion 10 of a flat spring 11 which has its lower end widened and preferably rounded to provide a valve 12 that is in contact with the seat provided by the opening 8. Preferably, and as illustrated, the opening 8 is surrounded by an inwardly flared flange 13, the said flange providing the seat for the valve 12. The scoop has its outer edge rounded and its upper face rounded upwardly, as at 14, to the lower wall of the valve seat.

By reference to Figure 1 of the drawings, it will be noted that when the connecting rod 4 is moved laterally by the turning of the crank shaft, 2, the oil 15 in the oil well 16 will force the valve 12 to unseated position, permitting a free inlet of oil to the tube. When the connecting rod bearing 3 has moved out of the well, the valve will automatically close, and the oil therein, incident to the vibration or movement of the crank shaft and connecting rod will be splashed against the crank shaft and the bearing in the connecting rod therefor.

It is thought that the foregoing description, when taken in connection with the drawings will fully set forth the construction and advantages of the improvement and that further detailed description is not considered necessary.

Having described the invention, I claim:—

1. In combination with an internal combustion engine, including the casing thereof having its lower portion provided with oil wells, a crank shaft, a piston connecting rod and a connecting rod bearing for the crank shaft which is disposed above the well, of a tubular member let in the bottom of the bearing and communicating with the bore thereof, said member having an outer closed wall provided with a projection forming a scoop, said tube having an inwardly flared opening above but in a line with the scoop, and a flat spring valve in the tube normally closing the opening.

2. In combination with an internal combustion engine including the casing therefor having its bottom provided with an oil well, a crank shaft in the casing, a piston connecting rod having a bearing for the crank shaft, and said bearing being disposed above but in a line with the well, of a tube screwed in the under face of the bearing and communicating with the bore thereof, said tube having its lower face closed and formed with an extension on one of the sides thereof to provide a scoop, the face of the tube opposite the scoop being depressed inwardly and having an opening therein surrounded by an inwardly flared wall, the upper portion of the tube being slitted, and a flat spring having an upper widened portion received in the slits and its lower portion in contact with the flared wall of the opening and normally closing said opening.

In testimony whereof I affix my signature.

MATT BURKE.